United States Patent [19]

Fujimori

[11] Patent Number: 5,676,442

[45] Date of Patent: Oct. 14, 1997

[54] PROJECTION DISPLAY APPARATUS

[75] Inventor: Motoyuki Fujimori, Suwa, Japan

[73] Assignee: Seiko Epson Corporation, Tokyo, Japan

[21] Appl. No.: 624,793

[22] Filed: Mar. 27, 1996

[30] Foreign Application Priority Data

Mar. 30, 1995 [JP] Japan .................. 7-074255

[51] Int. Cl.⁶ .................................. G03B 21/14
[52] U.S. Cl. .................................. 353/119
[58] Field of Search .................. 353/122, 119, 353/121

[56] References Cited

U.S. PATENT DOCUMENTS

| 4,613,207 | 9/1986 | Fergason | 353/122 |
| 4,880,303 | 11/1989 | Grunwald | 353/122 |
| 5,016,984 | 5/1991 | Fergason | 353/122 |
| 5,187,510 | 2/1993 | Vogeley et al. | 353/122 |

*Primary Examiner*—William Dowling
*Attorney, Agent, or Firm*—Mark P. Watson

[57] ABSTRACT

A projection display apparatus comprising a floppy disk drive device and floppy disk insertion opening in an appropriate arrangement is provided. A power supply unit, over which is disposed a floppy disk drive unit, is provided at the back of the projection display apparatus. The floppy disk drive unit is positioned offset to the left side of the projection display apparatus. A floppy disk (FD) insertion opening is positioned in a side wall at the left side of the exterior case of the projection display apparatus. An FD drive circuit board is positioned horizontally to the right of the floppy disk drive unit and slightly overlapping a drive control circuit board such that the electrical connections between the drive control circuit board and the FD drive circuit board can be made in this overlapping area. The side wall in which the floppy disk insertion opening is provided includes the operating panel in which the input/output terminals and operating switches are also disposed. This arrangement enables the floppy disk drive unit to be provided inside the projection display apparatus without using specific separate mounting members or reinforcing members therefor, and enables electrical connections between the power supply unit and control circuit board to be established via the FD drive circuit board without using separate wiring or harnesses. Operability is also improved because the floppy disk insertion opening is provided at the operating panel side.

22 Claims, 12 Drawing Sheets

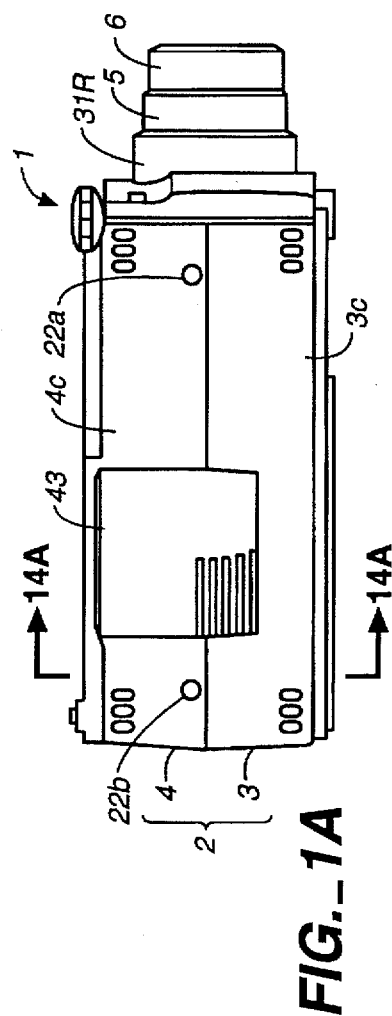
FIG._1A
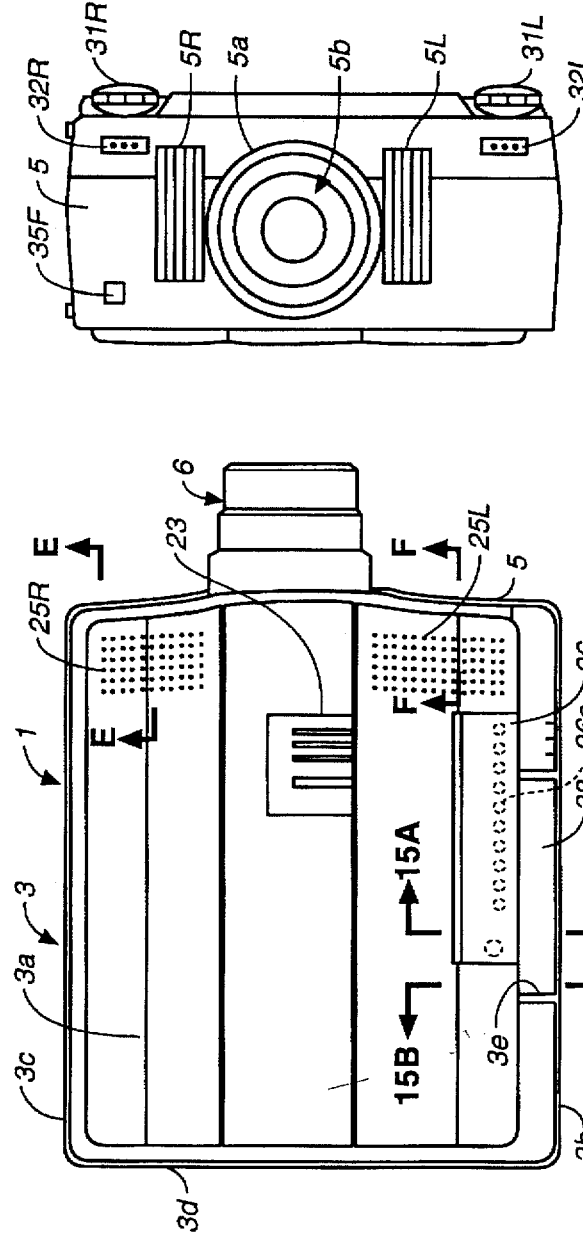
FIG._1B
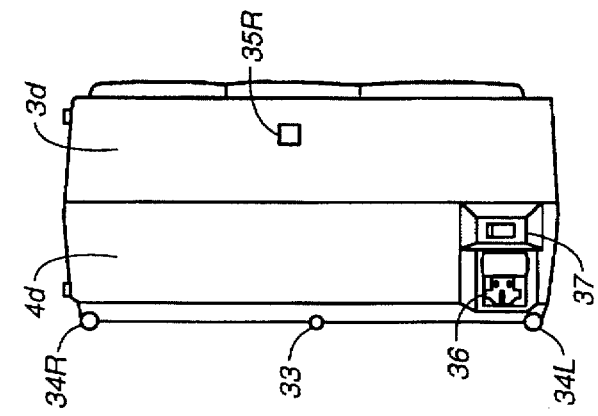
FIG._1C
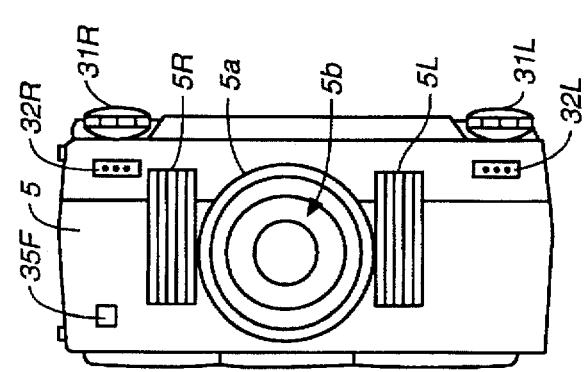
FIG._1D

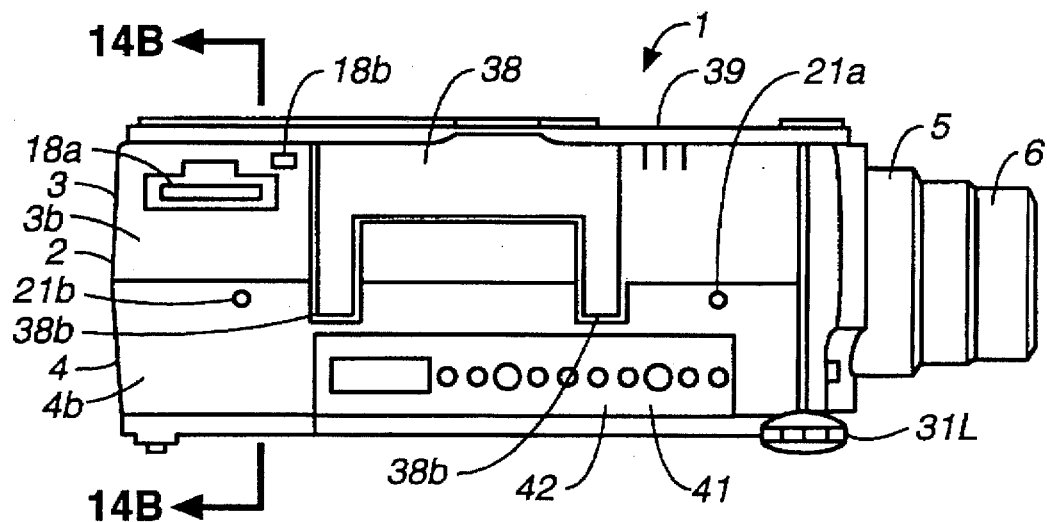
FIG._1E
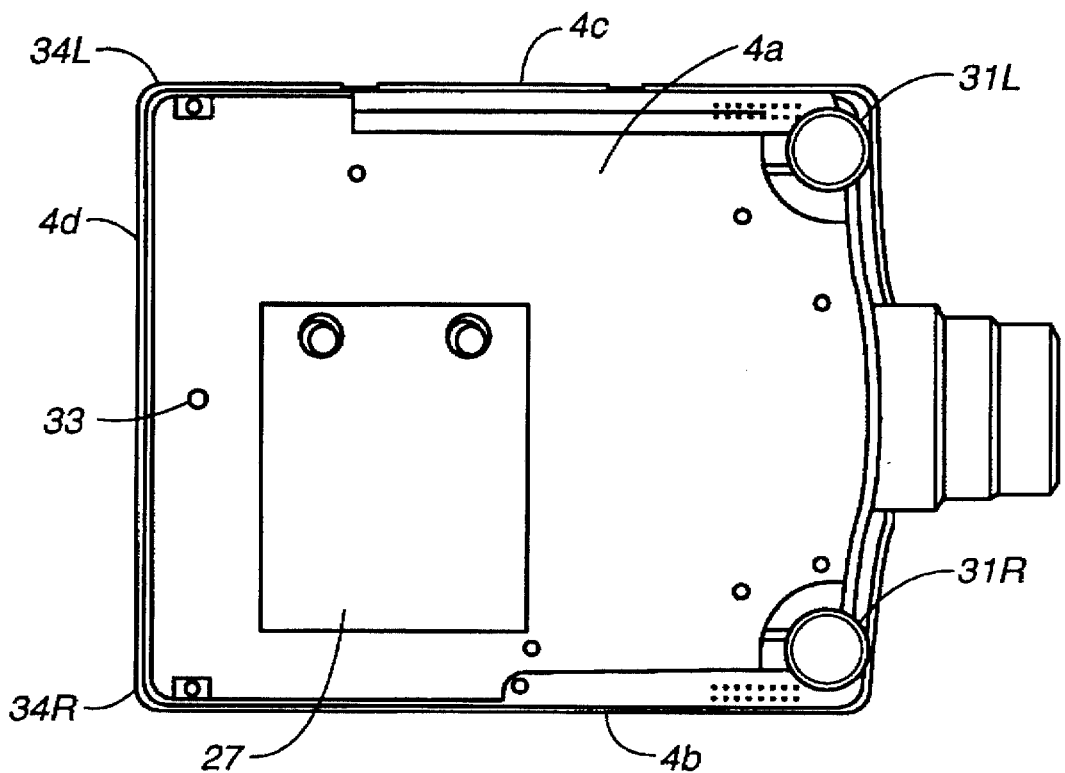
FIG._1F

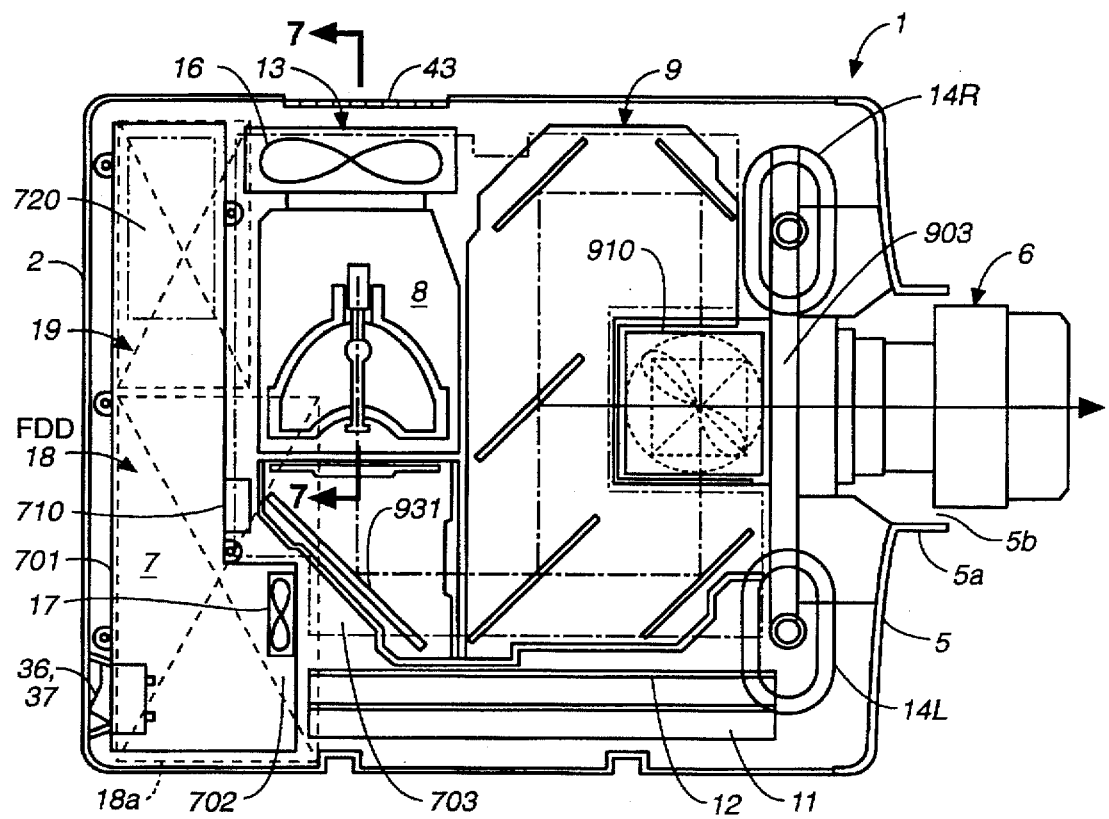
FIG._2A
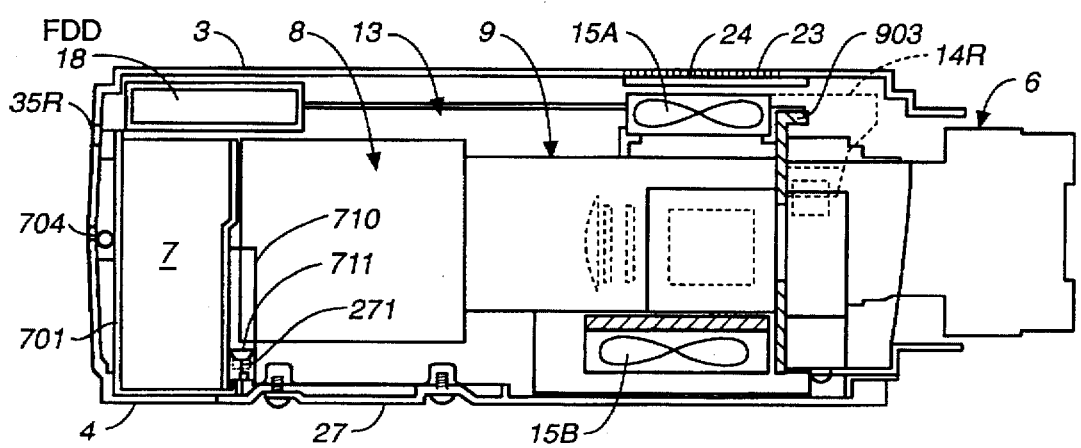
FIG._2B

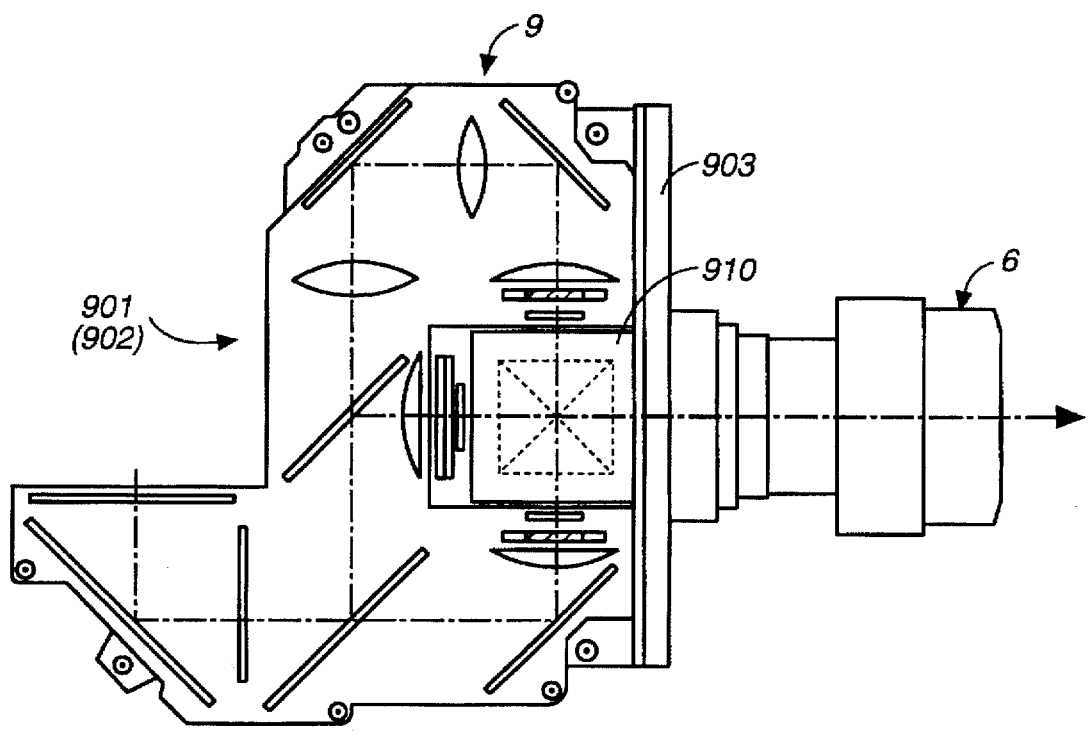
FIG._3A
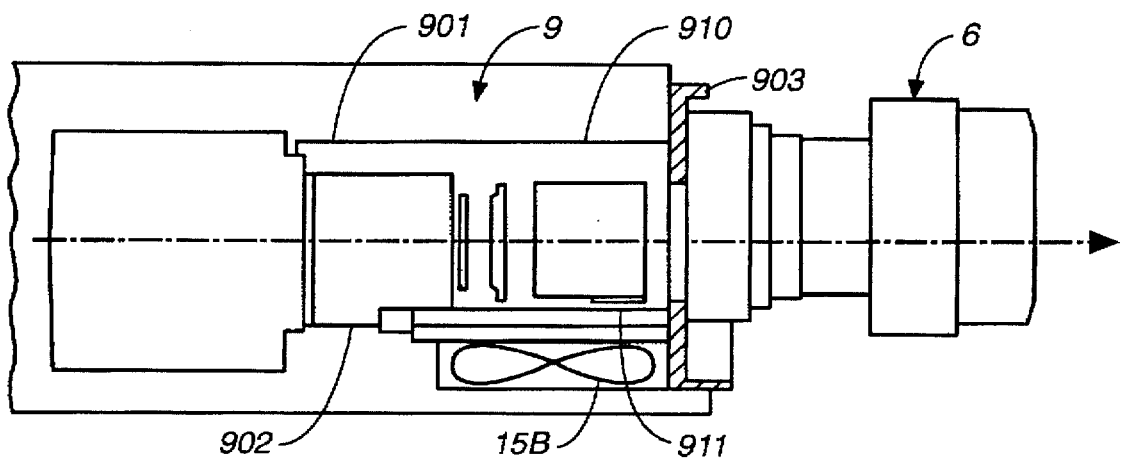
FIG._3B

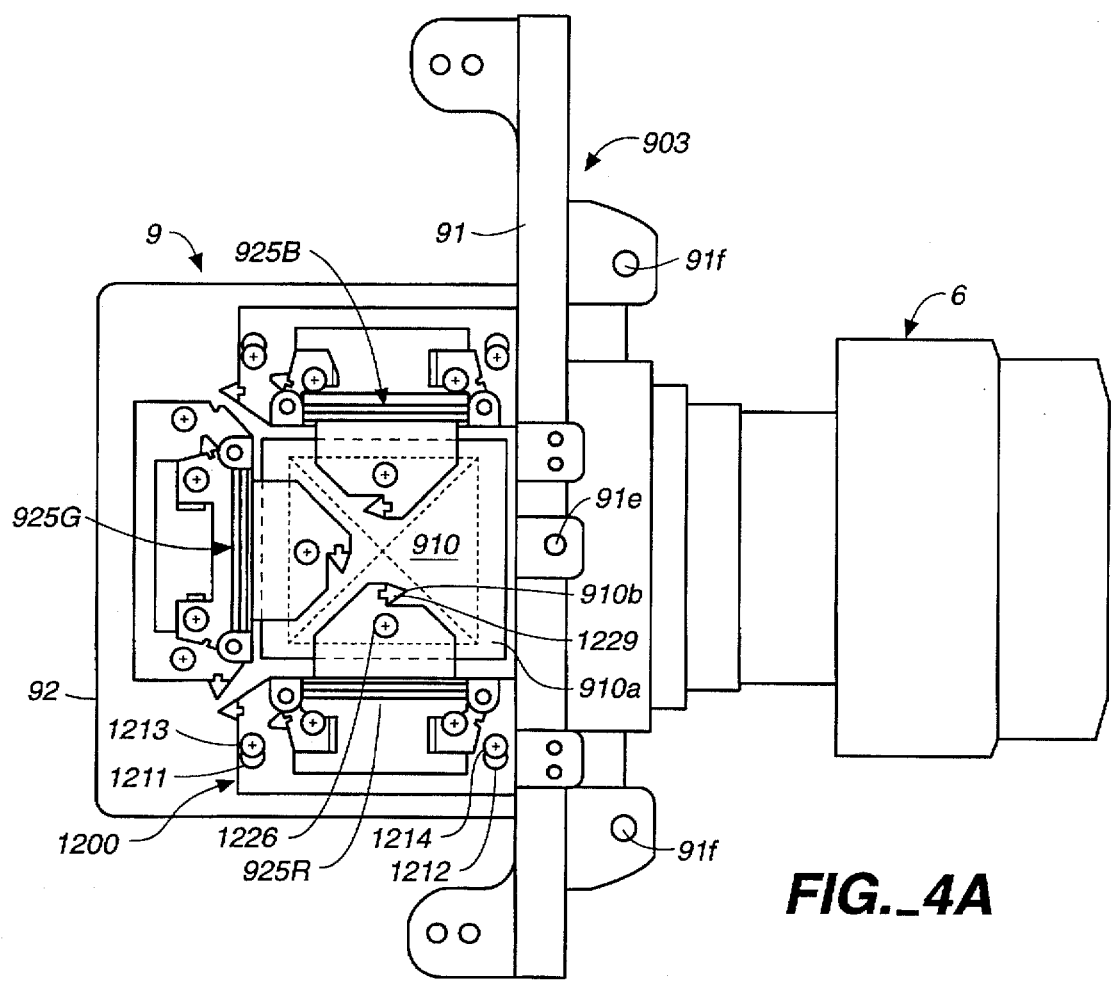
FIG._4A
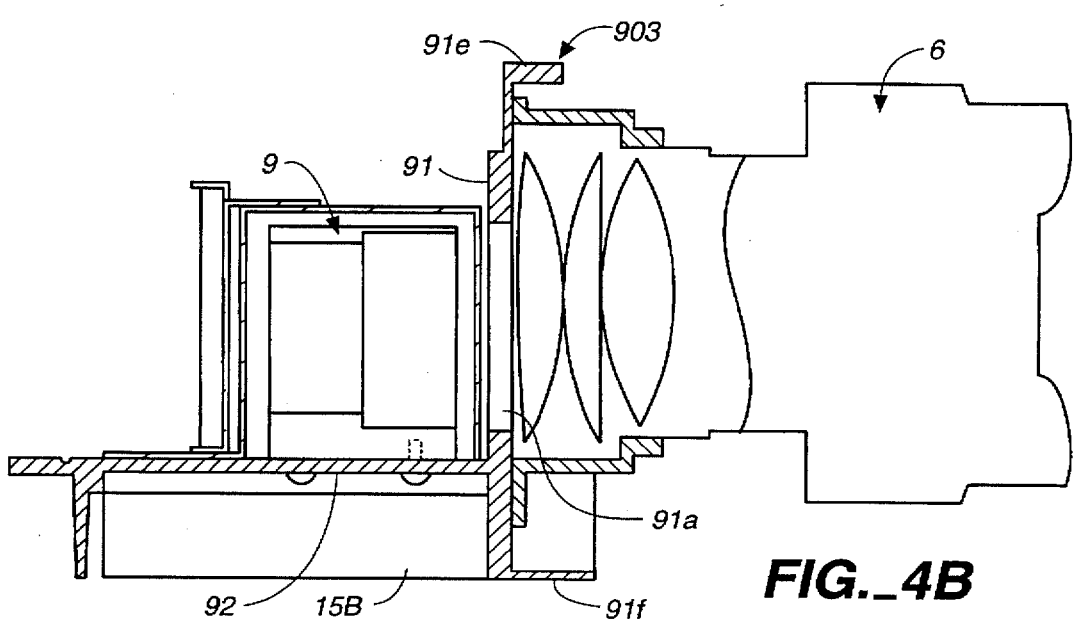
FIG._4B

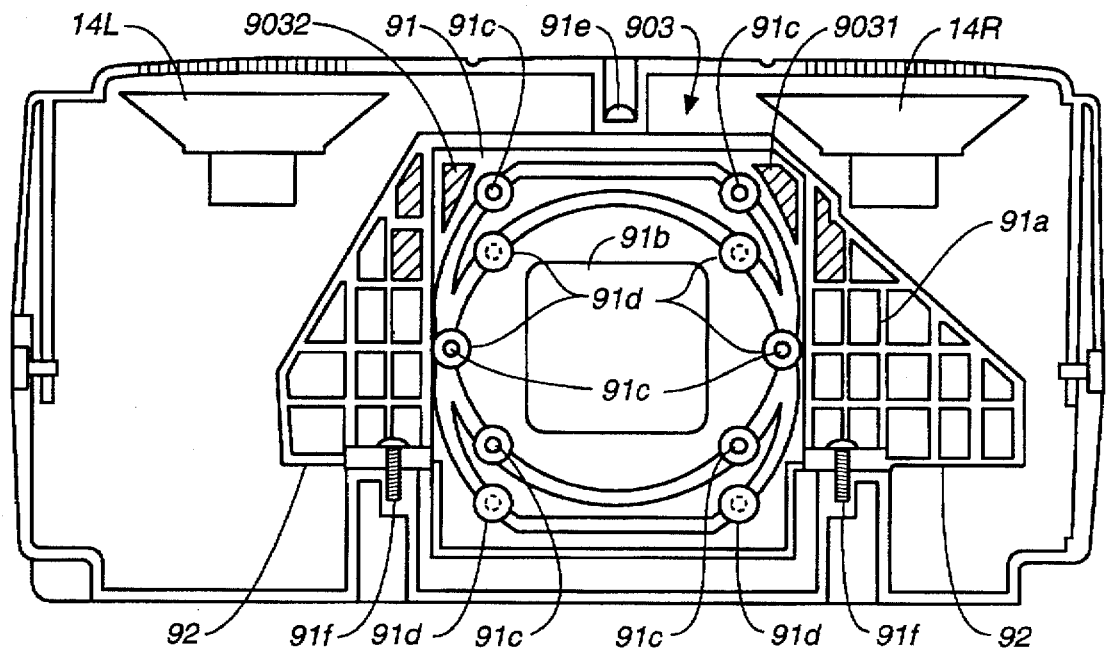
FIG._5
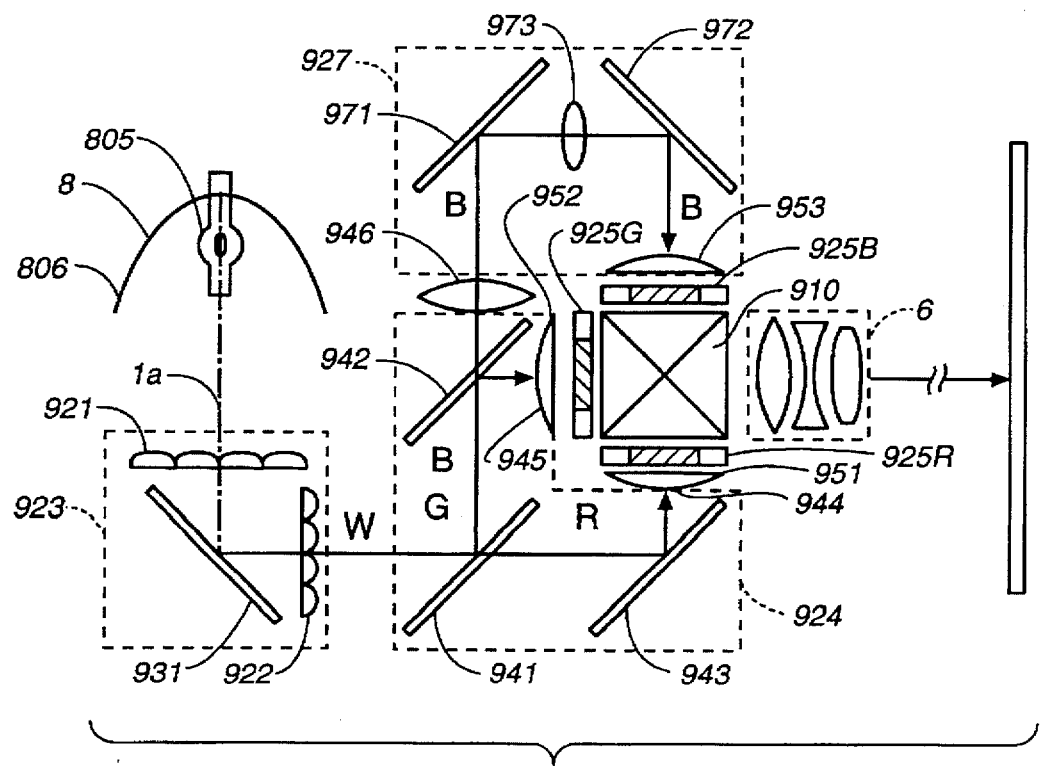
FIG._6

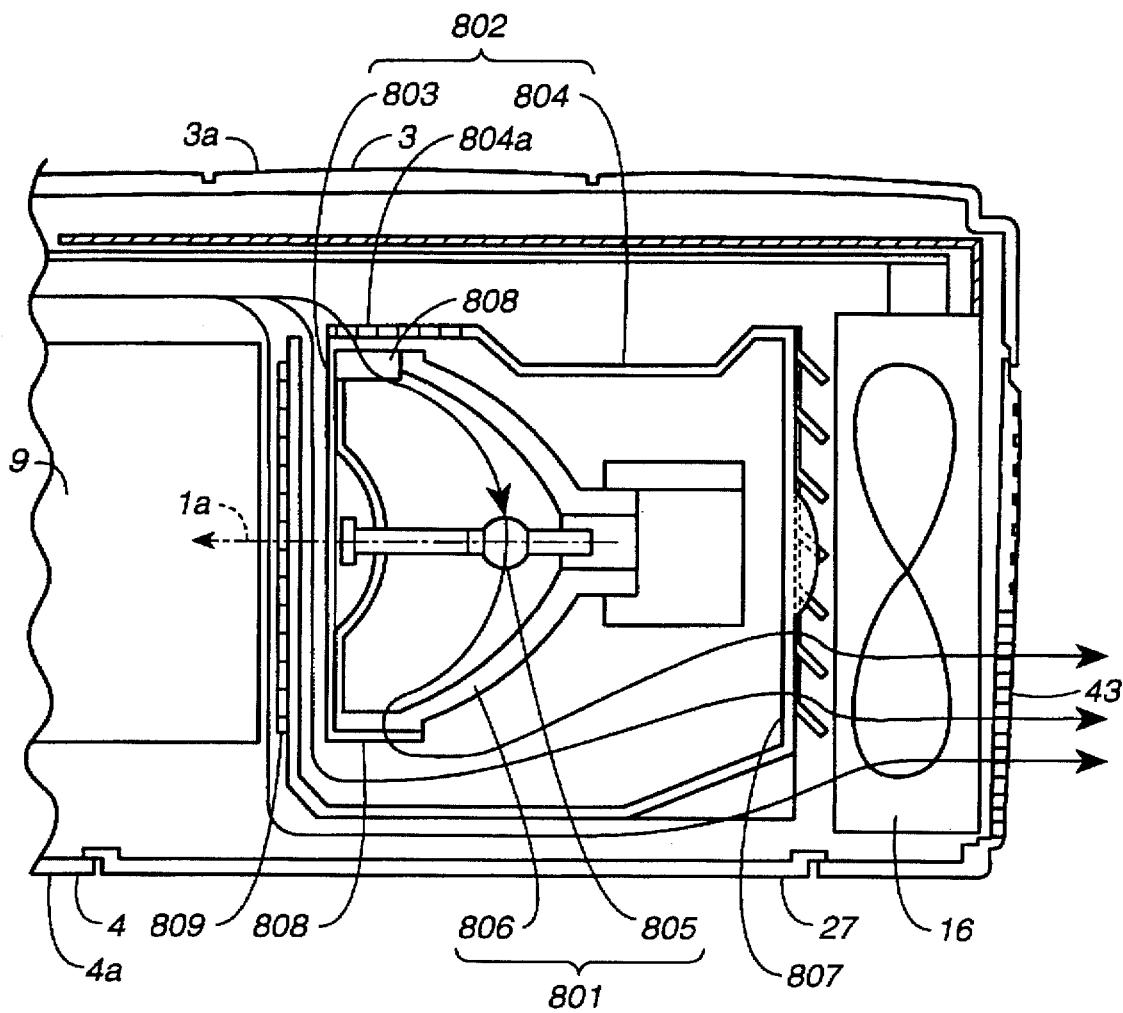
FIG._7

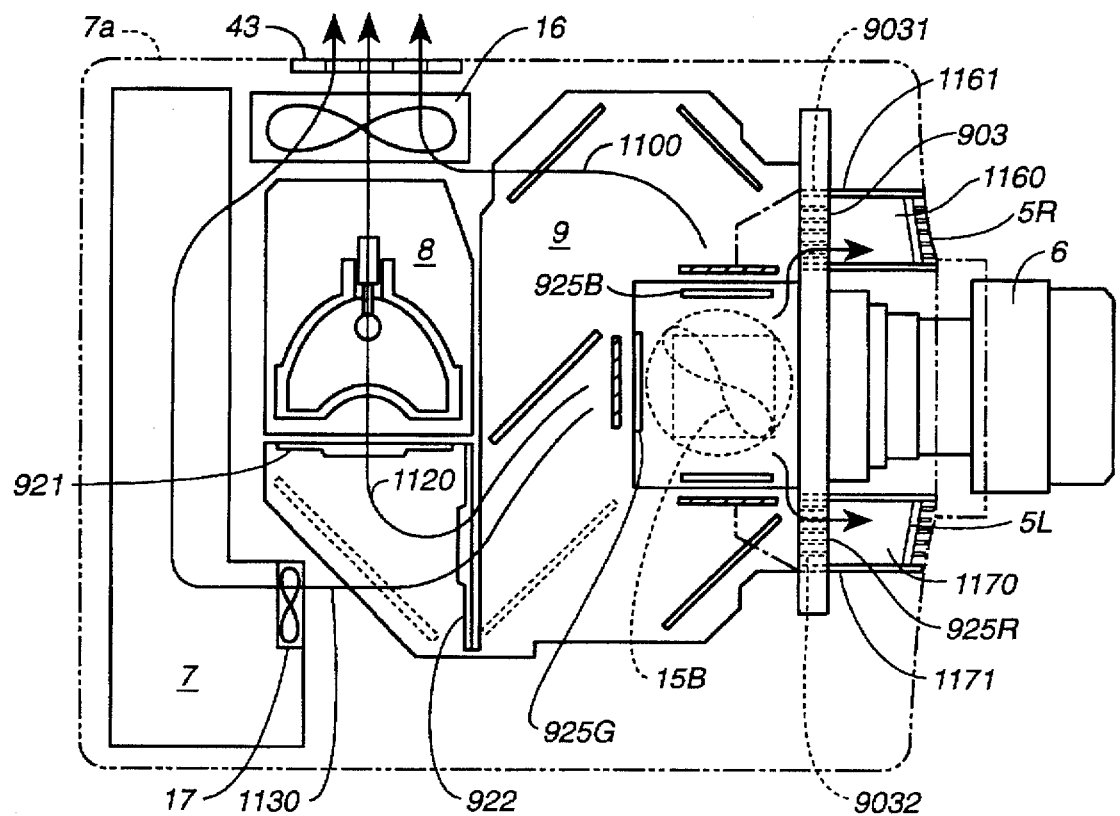
FIG._8
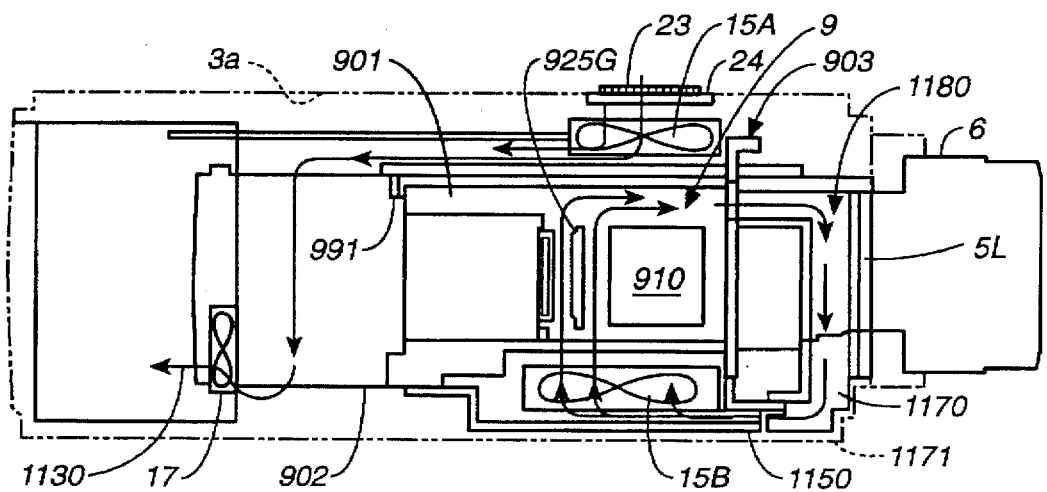
FIG._9

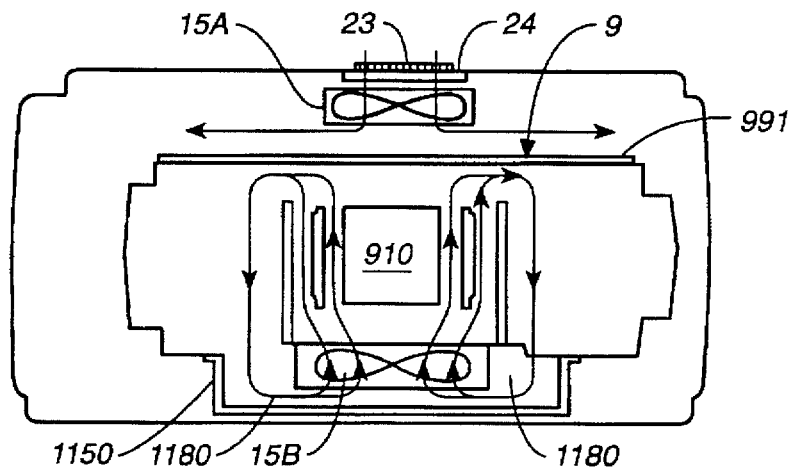
FIG._10
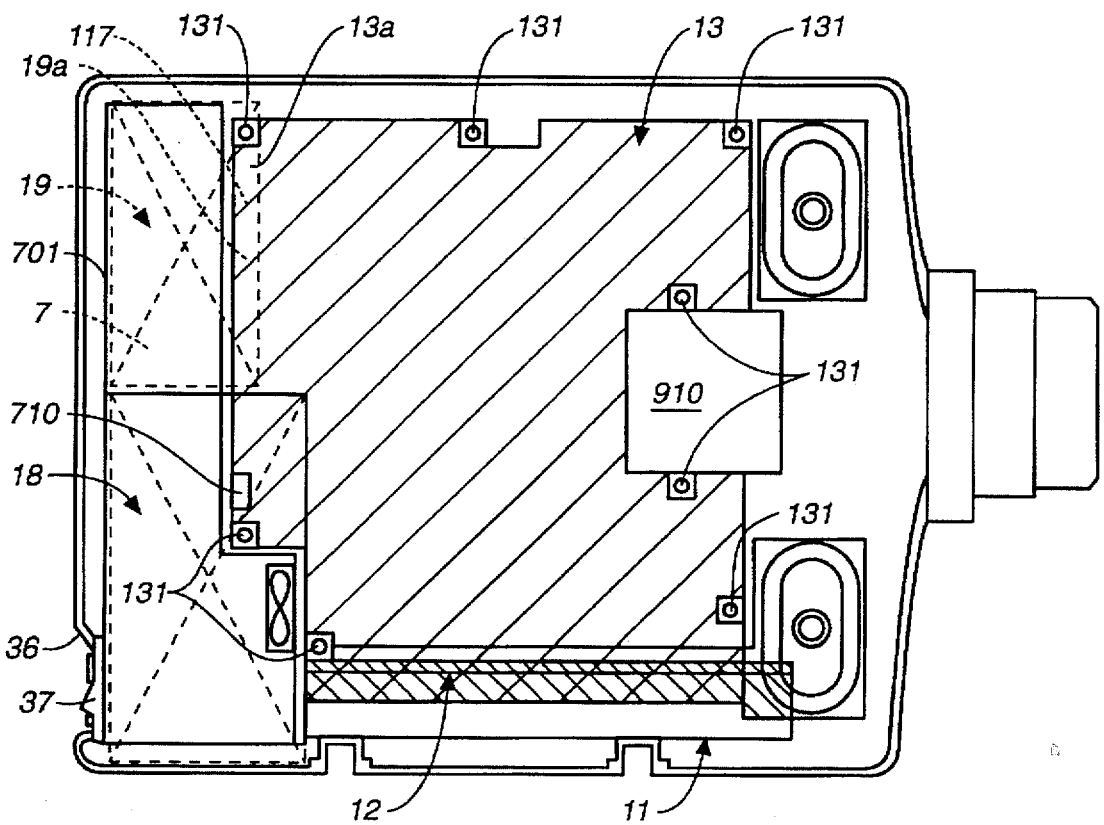
FIG._11

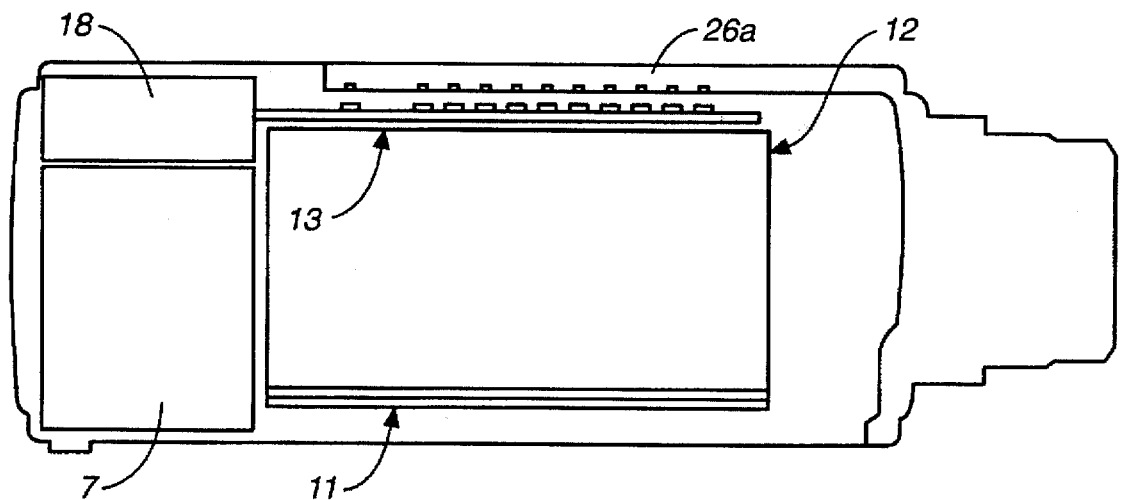
FIG._12
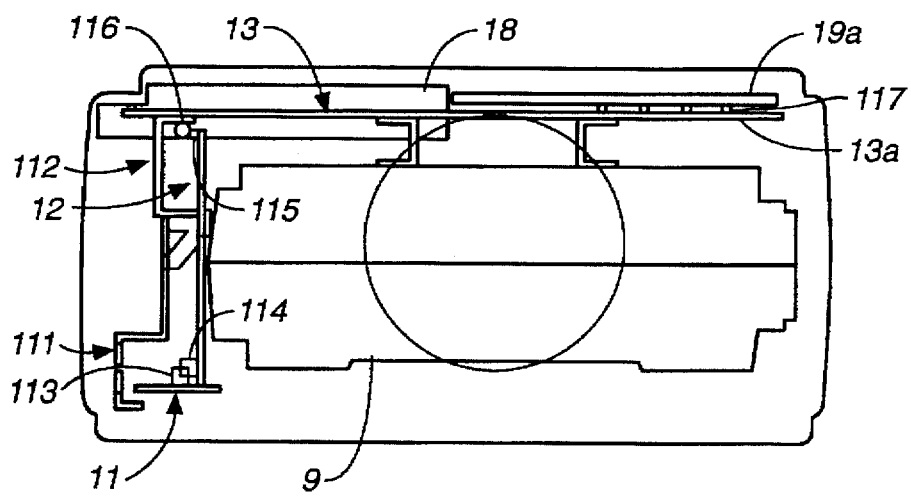
FIG._13

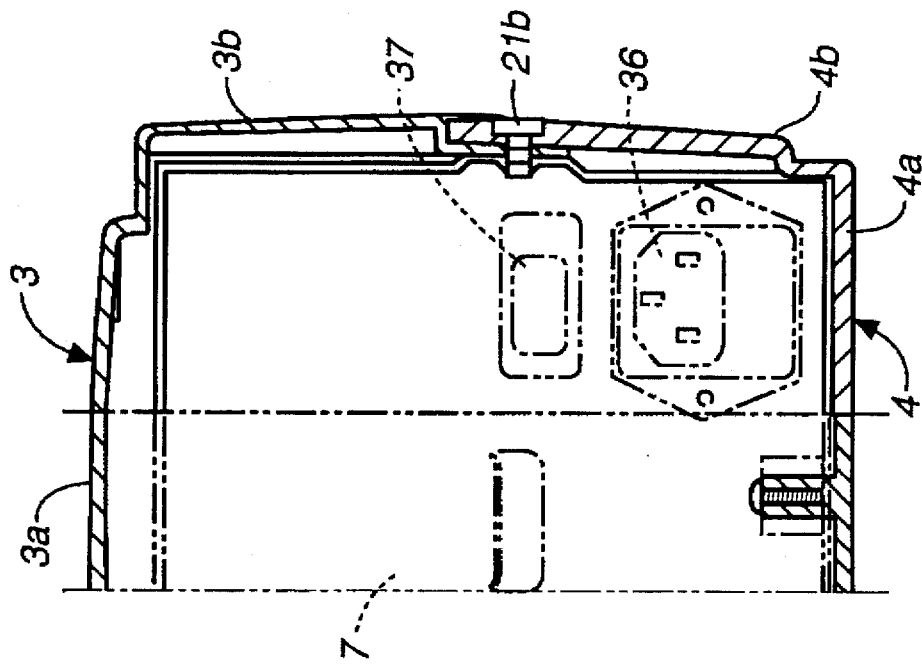
FIG._14B
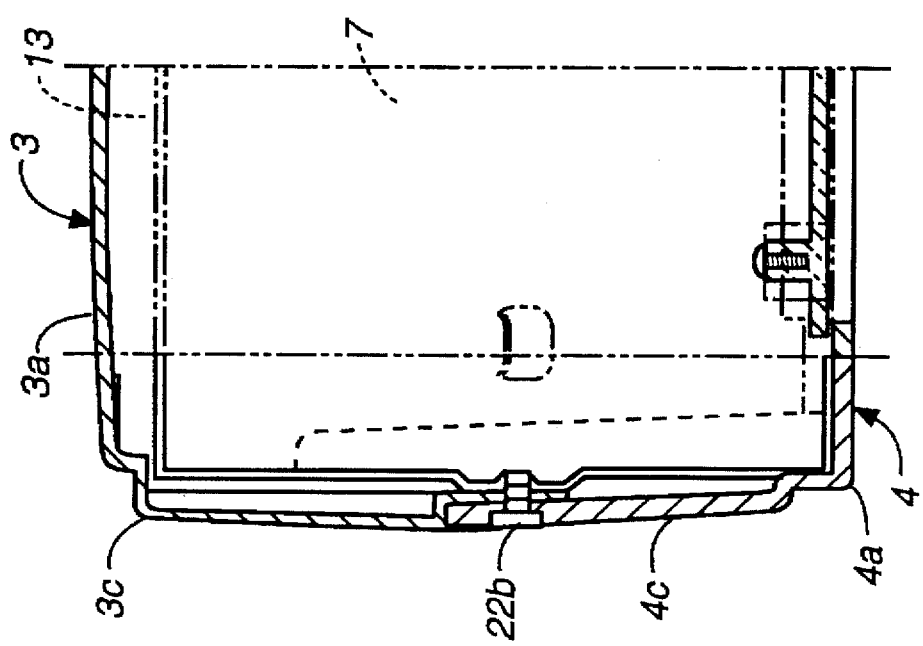
FIG._14A

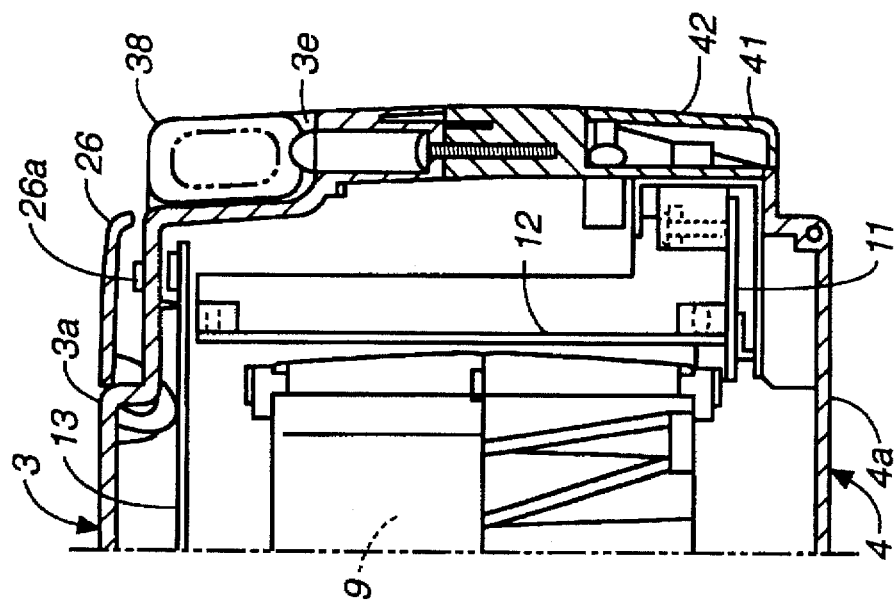
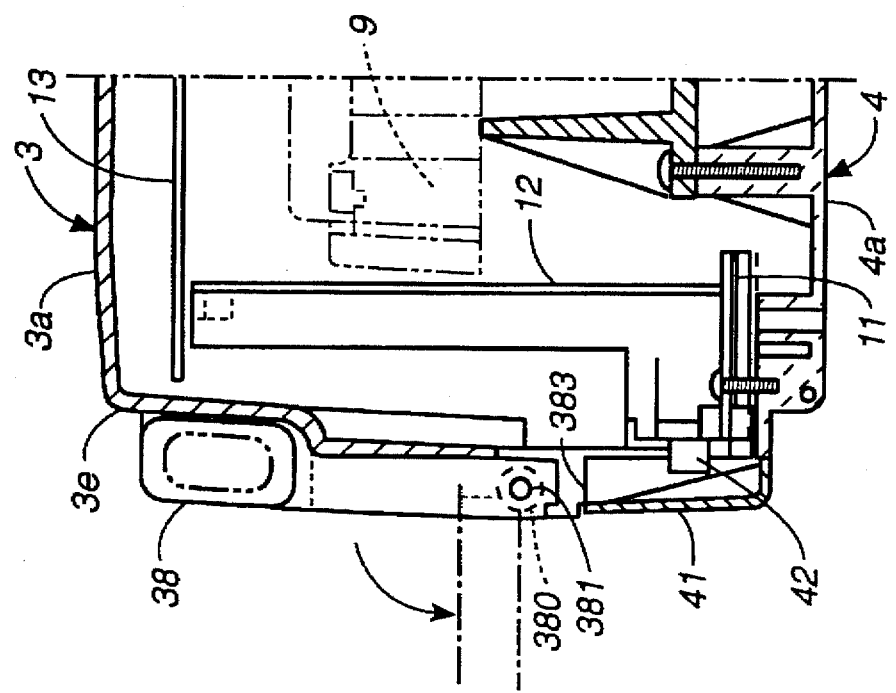
FIG._15B
FIG._15A ii# PROJECTION DISPLAY APPARATUS

BACKGROUND OF THE INVENTION

1. Field of the Invention

This invention relates generally to a projection display apparatus in which white light from a light source is resolved to red, green, and blue light beams. Each colored light beam is modulated according to the image information by a light valve made from a liquid crystal panel. The modulated colored light beams are combined and projected through a projection lens for projection enlarging to a display screen. More specifically, the present invention relates to a projection display apparatus of this type comprising a drive unit for a floppy disk or other data storage medium, such as a PCMCIA card.

2. Description of the Related Art

Projection display apparatuses today basically comprise the following parts: a light source lamp unit, an optical lens unit for optically processing the white light emitted from the light source lamp unit to generate a color image corresponding to video information supplied externally, a projection lens unit for projection enlarging the resulting optical image to a screen, a power supply unit, and plural circuit boards on which the control and other circuits are provided. Except for the projection lens unit, these components are provided inside the external case of the projection display apparatus. The projection lens unit is typically provided projecting from the front of the case. The operating parts of the power supply switch and other switches, a receptor window for the remote control unit, and an input/output terminal group for signal communications with external devices, are provided on the surface of the external projection display apparatus case.

This type of projection display apparatus is connected to a personal computer through the input/output terminal group to enlarge and display images supplied from the personal computer to a large screen on which many people can view the computer images together. However, because the projection display apparatus must be connected to a personal computer and external peripheral devices, transporting and setting up the equipment needed to receive and projection enlarge an image is cumbersome and time-consuming.

It would therefore be extremely convenient for a driver capable of reading the information stored to a floppy disk or other recording medium to be installed to the projection display apparatus, thereby enabling projection enlargement of images without connecting the projection display apparatus to other external devices.

SUMMARY OF THE INVENTION

An object of the present invention is therefore to provide a projection display apparatus comprising a drive unit for reading information stored on a floppy disk or other recording medium, such as a PCMCIA card.

To achieve this object, a projection display apparatus according to the present invention comprises a case; an insertion opening for inserting a floppy disk or other recording medium; and a recording medium drive unit for retrieving information stored in the recording medium inserted from the insertion opening and for supplying video signals corresponding to the information retrieved from the recording medium; and image projection unit for forming an optical image corresponding to the video signals supplied from the recording medium drive unit and for projection enlarging the optical image for display on a screen. The recording medium drive means and at least a portion of the image projection unit are housed in the case. The insertion opening may be positioned on either a right or a left side of the case.

An input/output unit comprising a group of input/output terminals for communicating with an external device is preferably arranged on the same side of the case as is the insertion opening.

In addition, the insertion opening is preferably positioned toward the top of the projection display apparatus, and a group of operating switches is arranged adjacent to the insertion opening.

The recording medium drive unit is also preferably fixed in a position above a light source lamp unit of the image projection unit.

A drive circuit board in the projection display apparatus, on which a drive control circuit for the recording medium drive unit is provided, is also preferably positioned adjacent to the recording medium drive unit in the widthwise direction of the projection display apparatus.

The insertion opening may alternatively be positioned toward the bottom of the projection display apparatus with the operating switches being arranged on the same side of the case as is the insertion opening.

A projection display apparatus according to the present invention can enlarge and project desired images by simply loading the recording medium to the projection display apparatus without connecting any external devices. This can be achieved because an insertion opening for inserting a floppy disk or other recording medium such as a PCMCIA card, and a drive unit for reading information from the recording medium inserted from the insertion opening, are integral components of the projection display apparatus.

Furthermore, when the input/output unit and the operating panel are provided on the same side as the insertion opening, all operations controlling the apparatus can be performed from the same side.

In addition, if the recording medium drive unit is provided inside the case of the projection display apparatus over the light source lamp unit or a power supply unit, the top of the light source lamp unit or power supply unit can easily be used as a fixed mounting bracket for the drive unit. Furthermore, if the drive circuit board is provided adjacent to the drive unit, the electrical connections between the drive unit and other circuit components can be easily established.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIGS. 1A to 1F are external views showing various sides of the projection display apparatus according to the present invention;

FIG. 2A is an internal plan view, and FIG. 2B is a cross sectional view of the component arrangement inside the projection display apparatus shown in FIGS. 1A to 1F;

FIG. 3A is an internal plan view, and FIG. 3B is a cross sectional view of the optical lens unit and the projection lens unit;

FIG. 4A is an internal plan view, and FIG. 4B is a cross sectional view of the head plate, prism unit, and projection lens unit;

FIG. 5 is a side view showing the method of securing the head plate, projection lens unit, and outer case;

FIG. 6 shows the optical system assembled into the projection display apparatus shown in FIGS. 1A to 1F;

FIG. 7 is a cross section of the light source lamp unit;

FIG. 8 is a plan view air flow diagram illustrating the cooling mechanism of the present invention;

FIG. 9 is an side view air flow diagram in cross section illustrating the cooling mechanism of the present invention;

FIG. 10 is an end view air flow diagram in cross section illustrating the cooling mechanism of the present invention;

FIG. 11 shows a top view the circuit board arrangement;

FIG. 12 shows a side view the circuit board arrangement;

FIG. 13 shows a front view the circuit board arrangement;

FIGS. 14A and 14B show a partial cross section illustrating the method of fastening the upper and lower cases; and FIGS. 15A and 15B show a partial cross section illustrating carrying handle attachment.

DESCRIPTION OF THE PREFERRED EMBODIMENTS

Overall Configuration

FIGS. 1A to 1F show an overview of a projection display apparatus according to the present invention. Projection display apparatus 1 in this example has a rectangular outer case 2, which basically comprises upper case 3, lower case 4, and front case 5, which determines the front of the projection display apparatus. The front of projection lens unit 6 projects from the middle of front case 5.

FIGS. 2A and 2B show the internal arrangement of the principal components housed in outer case 2 of projection display apparatus 1. As shown in FIGS. 2A and 2B, power supply unit 7 is located at the back on the inside of outer case 2. Forward of power supply unit 7 and adjacent thereto are light source lamp unit 8 and optical lens unit 9.

At the front center part of optical lens unit 9 is positioned the base end of projection lens unit 6. Parallel to each other and oriented in the front-back direction of the projection display apparatus on one side of optical lens unit 9 are interface circuit board 11 comprising the input/output interface circuits, and video circuit board 12 comprising the video signal processor. Above light source lamp unit 8 and optical lens unit 9 is drive control circuit board 13 for controlling operation of the projection display apparatus. Speakers 14R and 14L are provided in the right and left front corners of the projection display apparatus.

Above the middle of optical lens unit 9 is cooling intake fan 15A, and below the middle of optical lens unit 9 is circulation fan 15B for creating a cooling air flow. Exhaust fan 16 is provided in the side of the projection display apparatus on the back side of light source lamp unit 8.

Auxiliary cooling fan 17 is provided in power supply unit 7 on the side facing interface circuit board 11 and video circuit board 12. Auxiliary cooling fan 17 pumps the cooling air flow introduced by cooling intake fan 15A into power supply unit 7.

Directly above power supply unit 7 at the left side of the projection display apparatus is floppy disk drive unit 18.

Outer Case Construction

As shown in FIG. 1B, upper case 3 of outer case 2 comprises rectangular top wall 3a, and right and left side walls 3b and 3c, and back wall 3d descending essentially perpendicularly to top wall 3a from the three edges thereof not including the front edge.

As shown in FIG. 1F, lower case 4 similarly comprises rectangular bottom wall 4a, and right and left side walls 4b and 4c, and back wall 4d rising essentially perpendicularly to bottom wall 4a from the three edges thereof not including the front edge.

As shown in FIG. 1D, the middle of front case 5 curves outward to the front, forming a circular opening 5b around which is formed an annular rim 5a. The front of projection lens unit 6 passes through opening 5b from the front of the projection display apparatus.

Upper case 3 and lower case 4 are fastened together by means of screws 21a, 21b and 22a, 22b provided at two locations each in the right and left side walls (see FIGS. 14A and 14B). Front case 5 is held in position by the vertical clamping action of upper case 3 and lower case 4.

Air filter cover 23 is disposed toward the front in the middle of top wall 3a of upper case 3. Plural ventilation holes are formed in air filter cover 23, inside of which is disposed air filter 24 to prevent the penetration of dust and other small particulate from outside the case as shown in FIG. 2B. Behind (below) air filter 24 is positioned cooling intake fan 15A, which thus draws air in through air filter 24.

Plural through-holes 25R and 25L are also formed at the right and left front corners of top wall 3a in positions corresponding to the built-in speakers 14R and 14L. Operating switch cover 26 is provided along the left edge of top wall 3a with switch cover 26 hinged along one edge thereof for easy opening. Opening switch cover 26 exposes plural operating switches 26a arrayed inside the cover (see FIG. 15B).

Lamp replacement cover 27 is provided in bottom wall 4a of lower case 4 at a position corresponding to the built-in light source lamp unit 8. Lamp replacement cover 27 is fastened with screws to bottom wall 4a, and can be removed to replace light source lamp unit 8 by simply loosening the screws.

Height adjustment feet 31R and 31L are provided at the right and left front corners of bottom wall 4a, and can be rotated to adjust the front height of the projection display apparatus (the projection height) in fine increments. Height adjustment knurls 32R and 32L projecting forward from the front bottom of front case 5 can be turned to quickly adjust the approximate height of height adjustment feet 31R and 31L, respectively. In the middle at the back of bottom wall 4a is stud 33, which functions as a third foot complementing the two height adjustment feet 31R and 31L. Projection display apparatus 1 is thus supported at three points when placed on a table or similarly flat surface. Auxiliary studs 34R and 34L are also provided at the back corners of bottom wall 4a to prevent projection display apparatus 1 from rocking when placed on an uneven surface.

Receptor window 35F is provided in the upper right part of front case 5, which is the front surface of the projection display apparatus. Receptor window 35R is provided in the center of upper case back wall 3d, which is the top half of the rear cover of the projection display apparatus. The receptor windows are used to receive the control beam from a remote control device. This receptor window arrangement is convenient for remotely operating the projection display apparatus from various positions in front of or behind the projection display apparatus. Vertically oriented heat radiators 5R and 5L comprising plural exposed radiator fins are formed on the right and left sides of projection lens unit 6 projecting from the center of front case 5. As will be explained below, these heat radiators are for releasing heat from the air flow circulating inside the optical lens unit outside the projection display apparatus.

AC inlet 36 for connecting an external power supply, and main power switch 37, are provided at the left side of the back wall 4d forming the bottom half of the back of the projection display apparatus.

Carrying handle 38 is also provided on the left side of the projection display apparatus as shown in FIG. 1E. The two ends 38a and 38b of carrying handle 38 are fastened to the side of the case in a manner enabling the carrying handle 38 to pivot at the junction between the side walls 3b and 4b of upper case 3 and lower case 4. Side wall 3b in the upper case is molded to form a concavity 3e in which the handle is stored. LED display 39 for displaying the operating status of the projection display apparatus is also provided at the top of side wall 3b.

Input/output terminal cover 41, which opens and closes hinging on the bottom edge thereof, is provided in the left side wall 41b of the lower case. Opening input/output terminal cover 41 exposes the plural input/output terminals 42 inside the cover (see FIG. 15B).

Floppy disk insertion opening 18a is provided horizontally near the top rear part of the left upper case side wall 3b near top wall 3a. Eject button 18b is provided at the top fight above floppy disk insertion opening 18a.

On the opposite side of the projection display apparatus, i.e., in side walls 3c and 4c of the upper and lower cases forming the right side of the case, are formed ventilation holes 43 spanning both the upper and lower side walls. Cooling ventilation fan 16 is disposed on the inside of ventilation holes 43 with an air filter therebetween.

Light Source Lamp Unit

Light source lamp unit 8 is described next with reference to FIGS. 2A and 7.

Light source lamp unit 8 comprises lamp 801, and lamp housing 802, a roughly cubical housing in which lamp 801 is mounted. In this example, lamp housing 802 is a double-walled construction of inner housing 803 and outer housing 804. Lamp 801 comprises a halogen or other light source 805, and a reflector 806. The light emitted from light source 805 is directed along optical axis 1a toward optical lens unit 9.

The front of outer housing 804 in the direction of optical axis 1a is an opening to which ultraviolet filter 809 is disposed. In the opposite end of outer housing 804 are formed plural slits 807 through which the air flow cooling light source lamp unit 8 passes. Inner housing 803 is disposed in front of lamp 801 with an opening formed where the light from lamp 801 passes, and plural through-holes 808 formed around the perimeter for air cooling. It is to be noted that inner housing 803 and lamp 801 are integrally formed in this example so that replacing the lamp is a simple operation replacing a single integrated component.

Optical Lens Unit

All optical elements other than prism unit 910, which is the color combining means of the optical lens unit, are held between the top and bottom light guides 901 and 902 of optical lens unit 9 when positioned as shown in FIG. 3A. The top and bottom light guides 901 and 902 are respectively fastened by screws to upper case 3 and lower case 4, and similarly fastened to prism unit 910. Prism unit 910 is fastened by screws to the back of head plate 903, a thick, diecast member.

The base end of projection lens unit 6 is similarly fastened by screws to the front of head plate 903. As a result, prism unit 910 and projection lens unit 6 are fastened to opposing sides of high rigidity head plate 903, thus effectively formlug a single integral component. As a result of this integral structure, impact to the projection lens unit 6 side of this subassembly will not cause the position of projection lens unit 6 relative to prism unit 910 to change.

Optical System

The optical system used in this embodiment is described next by referring to FIG. 6, which shows only the optical system of projection display apparatus 1.

The optical system of the present embodiment comprises light source 805; illumination optics 923 comprising integrator lenses 921 and 922 (a uniform illumination optical element); color separation optics 924 for separating the white light W emitted from illumination optics 923 into the red, green, and blue (R, G, B) components; three liquid valves 925R, 925G, and 925B for modulating the respective RGB beams; prism unit 910 for recombining the modulated RGB light beams; and projection lens unit 6 for projection enlarging the recombined light beam to the viewing screen. A light guide 927 for guiding the blue light B separated by color separation optics 924 to the corresponding liquid valve 925B is also provided. In this invention, liquid crystal panels are used as light valves.

Light source 805 may be a halogen lamp, metal halide lamp, xenon lamp, or other type of lamp.

Illumination optics 923 also comprise reflecting mirror 931 for bending the optical axis 1a of the light emitted from light source 805 at a fight angle toward the front of the projection display apparatus. Integrator lenses 921 and 922 are placed on opposite sides of reflecting mirror 931 perpendicularly to the optical axes.

Color separation optics 924 comprise a blue/green reflecting dichroic mirror 941, green reflecting dichroic mirror 942, and reflecting mirror 943. The white light W incident to blue/green reflecting dichroic mirror 941 is split thereby so that the blue light B and green light G are reflected at a fight angle to green reflecting dichroic mirror 942. Red light R passes through blue/green reflecting dichroic mirror 941, is incident to reflecting mirror 943, and is reflected thereby at a right angle to red emitter 944, and through red emitter 944 to prism unit 910.

The blue and green light B, G reflected by blue/green reflecting dichroic mirror 941 is again split by green reflecting dichroic mirror 942, which reflects only the green light G at a right angle to green emitter 945, and thence to prism unit 910.

The blue light B passed by green reflecting dichroic mirror 942 is passed through blue emitter 946 to the light guide 927.

It is to be noted that there is an equivalent distance from the white light emissions side of the uniform illumination optical element (integrator lens 922) to each of the emitters 944, 945, and 946 of color separation optics 924.

Condensing lenses 951, 952, and 953 are placed at the output side of emitters 944, 945, and 946 of color separation optics 924. The color beam output from each emitter is thus incident to the corresponding condensing lens 951, 952, or 953, and converted to parallel beam light.

Of the parallel beam RGB light, the red and green light R, G is incident to and modulated by liquid valves 925R and 925G, respectively, resulting in the video information for each color to be added to each color. Specifically, these liquid valves are controlled by a drive means (not shown in the figures) according to the video information to modulate the light of the corresponding color passing through the liquid valves. This drive means may apply any of various known drive methods without specific modification.

The blue light B is guided through light guide 927 to the corresponding liquid crystal light valve 925B for modulation according to the video information as described above. Note that the light valves in this embodiment may, for example, use polysilicon TFT for the switching elements.

Light guide 927 comprises incidence-side reflecting mirror 971, emitting-side reflecting mirror 972, middle lens 973 disposed between reflecting mirrors 971 and 972, and condensing lens 953 disposed immediately before liquid valve 925B. The optical path for the blue light B, i.e., the distance traveled from light source 805 to the corresponding liquid crystal panel, is the longest of the three optical paths (R, G, and B), and loss of blue light B is therefore potentially greatest. Light loss is therefore suppressed by guiding the blue light B through light guide 927, and the effective lengths of the R, G, and B optical paths are therefore equivalent.

The R, G, and B light beams modulated by the respective liquid valves 925R, G, and B are incident to prism unit 910 and recombined thereby. As described above, prism unit 910, which is a dichroic prism, forms the color combining optics of this projection display apparatus. The color image recombined and output from prism unit 910 is then projection enlarged to a screen placed in a particular position by projection lens unit 6.

It is also preferable to provide a ½ wave plate in each of the R, G, and B optical paths in the optical system of the present embodiment described above to extract the s-polarized light of the RGB beams. This is because using only s-polarized light improves the color separation characteristic of the dichroic mirrors when compared with dichroic mirror performance when random polarized light containing both s- and p-polarized light is used.

Furthermore, while light guide 927 uses mirrors to reflect and direct the light rays, s-polarized light reflectivity is greater than p-polarized light reflectivity, and using only s-polarized light therefore also helps suppress light loss.

Power Supply Unit

As shown in FIGS. 2A and 2B, the various internal components of power supply unit 7 are housed inside metal shield case 701, which prevents electrical and magnetic noise generated inside power supply unit 7 from leaking. Shield case 701 is sized to extend from the left to right sides of outer case 2 of the projection display apparatus, and has a flat projection of a constant width toward the front of the projection display apparatus on the left side of power supply unit 7. This allows the uniform illumination reflecting mirror 931 of optical lens unit 9 to be placed in front of projecting block 702 at a forty-five degree angle to the front-back axis of the projection display apparatus.

More specifically, interior space on the back side of the projection display apparatus easily becomes wasted dead space. To use this potentially dead space 703 effectively, metal shield case 701 is formed with projecting block 702 extending into space 703, thereby increasing the space available for housing the power supply unit components.

Shield case 701 of power supply unit 7 has a hollow rectangular cross section; the rigidity of shield case 701 is generally greater than the rigidity of other components. The bottom of metal shield case 701 is fastened to bottom wall 4a of lower case 4 by plural screws. The top is similarly fastened by plural screws to top wall 3a of upper case 3. As a result, the outer case at the back of the projection display apparatus forms a solid integrated body having high rigidity because upper case 3 and lower case 4 are both fastened to the high rigidity metal shield case 701 in this area.

The weight of power supply unit 7 is also greater than that of the other components housed inside the projection display apparatus. Other relatively heavy components also housed inside the projection display apparatus include prism unit 910 and projection lens unit 6, which are fastened to opposing sides of head plate 903.

As is shown in FIGS. 2A and 2B, power supply unit 7 is housed in the back of projection display apparatus 1 with the length of power supply unit 7 parallel to the width of projection display apparatus 1. It is therefore possible to focus the center of gravity of power supply unit 7 at the widthwise center of projection display apparatus 1 by appropriately arranging the components inside power supply unit 7.

The prism unit 910 and projection lens unit 6, on the other hand, are similarly centered to the front-back axis of the projection display apparatus 1. As a result, the center of gravity of the projection display apparatus is adjusted to the center of the projection display apparatus in both side-side and front-back directions.

When carrying handle 38 is raised to carry the projection display apparatus with the left side up and projection display apparatus 1 is then accidentally dropped, projection display apparatus 1 will fall in this same attitude because the center of gravity is balanced in both side-side and front-back directions. If the center of gravity is offset to either side or to the front or back, however, projection display apparatus 1 will tend to rotate toward the center of gravity (the heavier side) as it falls. This will likely cause an outside corner of the outer case to strike the floor or ground first, resulting in a high localized impact force and a high potential for damage at the point of impact. By balancing the center of gravity both side-side and front-back, however, the present embodiment causes the entire right (bottom) side of the projection display apparatus to hit the floor or ground at the same time, thus greatly reducing the potential for localized damage.

It is to be noted that conventionally power supply unit 7 is fastened to outer case 2 using only the top or bottom of the power supply unit. As shown in FIG. 2B, however, power supply unit 7 is also fastened to outer case 2 by a screw 704 placed at a position corresponding to the vertical (top-bottom) center of gravity of projection display apparatus 1. More specifically, metal shield case 701 is fastened to back wall 4d of lower case 4 in this embodiment, thereby effectively preventing front-back shifting of power supply unit 7 as a result of vibration or impact applied in the front-back direction of the projection display apparatus.

Noise can also be suppressed by masking the lead wires that are one source of noise as short as possible. This can be accomplished by minimizing the length of the power supply paths from power supply unit 7 to the driven components. More specifically, AC inlet 36 and power switch 37 are fastened directly to the back wall of the power supply unit shield case 701, thereby eliminating the lead wires otherwise required to connect these components to power supply unit 7.

Interlock switch 710, which is linked to the opening and closing of lamp replacement cover 27 provided on the bottom of the projection display 7 apparatus, is also provided integrally to the front face of power supply unit shield case 701 slightly separated from shield case block 702 toward the right side of the projection display apparatus. The operating member 711 of interlock switch 710 faces the bottom of the unit, and is normally pushed up by operating member 271 projecting upward from the top of lamp replacement cover 27. Interlock switch 710 is ON in this position. When lamp replacement cover 27 is then removed, the operating member of interlock switch 710 descends, and interlock switch 710 switches OFF. By thus fastening interlock switch 710, which is conventionally provided in a position removed from power supply unit 7, on the side of power supply unit shield case 701, the lead wires connecting the switch to the power supply unit can be shortened.

Ballast circuit unit 720, which is the drive circuit for light source lamp unit 8, which is positioned closer to the front of the projection display apparatus than power supply unit 7, is also provided on the same side as light source lamp unit 8, thereby significantly shortening the lead wires from power supply unit 7 to light source lamp unit 8.

By thus minimizing the distance of the power supply path from power supply unit 7 to each of the connected drive components in this embodiment, the number of potential noise sources is minimized, and noise is suppressed.

Floppy Disk Drive Unit

As described above, floppy disk drive unit 18 is fastened by screws or similar means to the top of power supply unit 7, which is fastened inside the projection display apparatus in a manner improving the impact resistance and drop strength. Of the internal components assembled in a projection display apparatus, the optical components are typically not enclosed with a shield case or other strong member. Installing floppy disk drive unit 18 to the optical system components in a manner as described above requires a separate reinforcing member or bracket.

Power supply unit 7 and light source lamp unit 8 in the present embodiment, however, are enclosed by such a case, and a flat area is formed on the top of this case. The present embodiment therefore uses this flat area to secure floppy disk drive unit 18, making it possible to secure floppy disk drive unit 18 without requiring additional reinforcing members.

The shield case can also be used to electrically ground floppy disk drive unit 18 when it is installed to power supply unit 7 and light source lamp unit 8.

Floppy disk drive unit 18 is also positioned at the left side of the projection display apparatus over power supply unit 7 to position floppy disk insertion opening 18a of floppy disk drive unit 18 in the left side wall 3b of the upper outside case 3. The operating switches 26a are provided in the top wall 3a above the left side wall 3b, and the input/output terminals for communicating with external devices are provided at the bottom of left side wall 3b.

As a result, all operations of projection display apparatus 1, including inserting and ejecting a floppy disk, can be executed from left side wall 3b for convenience.

Circuit Board Arrangement

The arrangement of interface circuit board 11, video circuit board 12, drive control circuit board 13, and FD drive circuit board 19, on which the drive control circuitry for floppy disk drive unit 18 is provided, is described below with reference to FIGS. 11, 12, and 13.

As shown in FIG. 11, drive control circuit board 13 is provided below and parallel to the bottom surface of upper case top wall 3a, and is fastened to upper case 3 with screws at plural points around the perimeter of the circuit board. Drive control circuit board 13 covers the tops of light source lamp unit 8 and optical lens unit 9, and has a rectangular cut-out conforming to prism unit 910. An array of contacts corresponding to operating switches 26a, which are arrayed at the top left side of the projection display apparatus, is provided on drive control circuit board 13 on the left side of the projection display apparatus.

As shown in FIG. 13, interface circuit board 11 is placed parallel to and slightly elevated from bottom wall 4a of lower case 4. Video circuit board 12 is placed parallel to the left side of the outer case in an attitude rising vertically from the surface of interface circuit board 11. These two circuit boards 11 and 12 are supported by circuit board support bracket 111, which is fastened to bottom wall 4a of lower case 4. Shield plate 112 is attached to the top of support bracket 111, and the top edge of shield plate 112 extends to the top edge of video circuit board 12. A shield gap is thus formed by and between the two circuit boards 11 and 12, support bracket 111, and shield plate 112, and noise from the electrical and electronic components provided on the circuit boards and in this space is prevented from leaking outside.

FD drive circuit board 19 is provided beside floppy disk drive unit 18 on the right side of the projection display apparatus, parallel to the bottom of top wall 3a with front part 19a partially overlapping drive control circuit board 13 above back part 13a.

The electrical connections between the various circuit boards is described next.

Connector 113 for connection with video circuit board 12 is provided on the surface ofintorface circuit board 11. Connector 114 compatible with connector 113 is provided on the surface of video circuit board 12 near the bottom edge thereof. Another connector 115 for connection with drive control circuit board 13 is provided on the surface of video circuit board 12 near the top edge thereof, and connector 116 compatible with connector 115 is provided on the back of drive control circuit board 13. As a result, the connections between circuit boards 11, 12, and 13 can be established with the circuit boards arranged as shown in FIG. 13.

Back part 13a of drive control circuit board 13 and front part 19a positioned thereabove are also electrically connected by means of mutually compatible connectors 117.

As a result, the electrical connections between the circuit boards of the present invention can be established without using lead wires or harnesses between the circuit board. The number of potential noise sources is therefore reduced, and noise can be suppressed.

As also shown in FIG. 11, the corners and perimeter of drive control circuit board 13 are fastened to outer case 2, i.e., to a ground, using screws. While such corner and edge areas are a common noise source, establishing a ground can effectively suppress noise.

Construction of the Head Plate Section

The shape of head plate 903 is described next with reference to FIGS. 4A, 4B and 5.

Head plate 903 basically comprises vertical wall 91, which is perpendicular to the width of the projection display apparatus, and bottom plate 92, which extends horizontally from the bottom edge of vertical wall 91.

As shown in FIG. 5, vertical wall 91 is a tall wall with high surface rigidity as a result of plural vertical and horizontal reinforcing ribs 91a formed on the surface. A rectangular opening 91b permitting passage of light emitted from prism unit 910 is formed in the center of vertical wall 91. Prism unit screw holes 91c, and screw holes 91d for securing the base end of projection lens unit 6, are also formed in vertical wall 91.

As shown in FIGS. 4A and 4B, the base end of projection lens unit 6 is fastened to the front-side surface of vertical wall 91, and prism unit 910 is fastened to the surface on the other side of vertical wall 91.

Securing prism unit 910 and projection lens unit 6 in a mutually aligned state to opposing sides of a high rigidity vertical wall 91 forms a highly integrated subassembly resistant to misalignment of prism unit 910 and projection lens unit 6 as a result of impact.

Circulation fan 15B is provided on the back of bottom plate 92 of head plate 903. Plural ventilation holes (not shown in the figures) are therefore formed in bottom plate 92 to permit a constant flow of cooling air.

As is shown in FIGS. 2B and 4A, flanges 91e and 91f for fastening to upper case 3 and lower case 4 are formed on the top and bottom edges of vertical wall 91 of head plate 903. Flanges 91e and 91f are then fastened to upper case 3 and lower case 4, respectively, by screws.

Upper case 3 and lower case 4 are thus fastened to power supply unit 7 at the back parts thereof, and to head plate 903 at the front parts thereof. By thus fastening both the front and the back of upper case 3 and lower case 4 to high rigidity members, upper case 3 and lower case 4 are fastened together in a highly rigid, integrated structure. The impact resistance of the projection display apparatus is thus improved, and damage resulting from the projection display apparatus dropping or falling is reduced.

Cooling Mechanism

The cooling mechanism of the various heat-emitting components of projection display apparatus 1 according to the present invention is described next with reference to FIGS. 7, 8, 9, and 10.

FIG. 8 is a plan view of the basic cooling air flow in projection display apparatus 1 according to the present invention.

Outside air (i.e., air from outside the projection display apparatus) is brought in by cooling intake fan 15A through the ventilation holes formed in air filter cover 23 in top wall 3a of upper case 3, and flows horizontally through the space formed between top wall 3a and upper sealing plate 911 providing the top of optical lens unit 9. Ventilation fan 16 positioned at the right side of the projection display apparatus then pushes the air back outside. As shown in FIG. 8, part 1100 of the main air flow passes directly over upper sealing plate 991 provided over optical lens unit 9 to ventilation fan 16, and is vented thereby outside the projection display apparatus.

Another part 1120 of the air flow flows over upper sealing plate 991 provided over optical lens unit 9 toward the back of the projection display apparatus, flowing from the front of light source lamp unit 8 through ventilation holes 804a formed in outer housing 804 and ventilation holes 808 formed in inner housing 803 to the inside of light source lamp unit 8. The air then passes through ventilation holes 807 in the back of light source lamp trait 8, and is vented outside by ventilation fan 16.

Another part 1130 of the air flow passes over optical lens unit 9 toward the back of the projection display apparatus, and is pumped into power supply unit 7 by auxiliary cooling fan 17 disposed in the side thereof. The air then flows through power supply unit 7 and is vented from the other end thereof by ventilation fan 16 to outside the projection display apparatus.

The vertical air flow 1130 through power supply unit 7 is shown in a side cross section of the projection display apparatus in FIG. 9.

As shown in FIG. 9, air flow 1130 introduced by cooling intake fan 15A is pulled by auxiliary cooling fan 17 into power supply unit 7. More specifically, the air flows over upper sealing plate 991 covering optical lens unit 9, through the ventilation holes (not shown in the figures) in light guide 901, down past optical lens unit 9 where integrator lenses (uniform illumination optical element) 921 and 922 are provided, through the ventilation holes in bottom light guide 902 to the space below optical lens unit 9, and therefrom into power supply unit 7. The air is then vented outside by ventilation fan 16 on the other end of power supply unit 7.

The auxiliary cooling fan 17 provided in the present invention thus forces a cooling air flow into power supply unit 7 to effectively cool the inside of the power supply unit, which is a primary heat source.

The vertical air flow 1120 through light source lamp unit 8 is shown in a side cross section in FIG. 7.

As shown in FIG. 7, air flow 1120 passes through the space between top light guide 901 and the underside of upper case top wall 3a to the front (light-emitting) end of light source lamp unit 8. The air then flows over the surfaces of the light source lamp unit components to ventilation fan 16 located at the back (opposite end) of light source lamp unit 8. Thus, air flow 1120 flows over the inside and outside surfaces of both outer housing 804 and inner housing 803, and over the surface of reflector 806.

Air flow 1120 following the optical axis from the front to the back of light source lamp unit 8 is thus formed by the present invention to effectively cool the area around such heat sources as light source 805 and reflector 806.

As also shown in FIGS. 9 and 10, an effectively airtight seal is formed on the top and bottom of optical lens unit 9 by upper sealing plate 991 and lower sealing plate 1150, and circulation fan 15B is positioned directly above lower sealing plate 1150. The fronts of upper and lower sealing plates 991, 1150 are fastened to head plate 903, and the backs are fastoned to top and bottom light guides 901 and 902, respectively.

Effectively airtight air circulation channels 1160 and 1170 are also formed in front of head plate 903 between the inside surface of front case 5 and sealing plates 1161 and 1171 on the left and right sides, respectively, of projection lens unit 6. Air circulation channels 1160 and 1170 thus route a vertical air flow past the inside surface of front case 5. Heat radiators 5R and 5L are also formed in front case 5 where air circulation channels 1160 and 1170 are formed to dissipate heat therefrom. Plural ventilation holes 9031 and 9032 are also formed in head plate 903 to pass air from inside optical lens unit 9 to air circulation channels 1160 and 1170.

Thus, driving circulation fan 15B in the present invention creates air circulation flow 1180 moving upward along both front and back sides of each light valve, through air circulation channels 1160 and 1170, and back to the intake side of circulation fan 15B as shown in FIGS. 9 and 10.

Air circulation flow 1180 thus cools the light valves, polarizing plates, and other optical components as it travels upward, and dissipates heat while passing horizontally over upper sealing plate 991 by means of a heat exchange operation using upper sealing plate 991 to transfer heat to the air flow introduced from outside the projection display apparatus. As air circulation flow 1180 flows down through air circulation channels 1160 and 1170, heat is also dissipated to the outside through heat radiators 5R and 5L formed in front case 5, thus assuring sufficient cooling.

In the present invention thus described, the inside of optical lens unit 9 is cooled not by introducing air from outside the projection display apparatus, but by forming internal air circulation cooling optical lens unit 9.

When optical lens unit 9 is cooled by introducing outside air, dust and other airborne particulate is also introduced to optical lens unit 9. This dust and other airborne particulate can then cling to the surface of the optical components, possibly resulting in poorly focused projection images and other problems. These problems do not occur in a projection display apparatus according to the present invention, however, because optical lens unit 9 is cooled with an air flow as described hereinabove.

In other words, a projection display apparatus according to the present invention as described above includes a cooling mechanism comprising a dust-resistant construction suitable for cooling the optical lens unit. Light can also be uniformly introduced to the center and edges of the light valve opening, and the light quantity in the center area can be reduced 1/3 to 1/5, by using integrator lenses as described above. Sufficient cooling can therefore be achieved by using this cooling mechanism in combination with this light guide design.

As described above, in the projection display apparatus according to the present invention, it is thereby possible to projection enlarge any desired image stored to a floppy disk or other recording medium without connecting a peripheral device by loading the recording medium to the built-in drive unit. Dust and other particulate also does not enter because the insertion opening for the recording medium is provided in the side of the outer case.

Furthermore, by providing the operating switches and the input/output terminal group for communicating with external devices adjacent to the insertion opening on the same side of the outer case in which the insertion opening is provided, the side of the outer case also functions as the operating panel of the projection display apparatus. As a result, inserting and ejecting the floppy disk or recording medium, and other operations, can all be executed from the same side of the projection display apparatus, thus improving operability.

Moreover, if the drive unit is also fastened to the light source lamp unit or power supply unit, a separate member for mounting the drive unit is not required, separate reinforcing members are not required, and the drive unit can be easily installed. This construction also makes it possible to electrically ground the shield cases of the light source lamp unit and the power supply unit.

If the drive circuit board on which the power supply unit control circuit is provided is disposed adjacent to the power supply unit widthwise to the projection display apparatus, the electrical connections between the power supply unit and the drive unit can be easily established, and the need for discrete electrical power supply and signal lines can be eliminated.

While the invention has been described in conjunction with several specific embodiments, it is evident to those skilled in the art that many further alternatives, modifications and variations will be apparent in light of the foregoing description. For example, PCMCIA slots may also be incorporated in the projection display apparatus, instead of or in addition to the floppy disk drive unit. Thus, the invention described herein is intended to embrace all such alternatives, modifications, applications and variations as may fall within the spirit and scope of the appended claims.

What is claimed is:

1. A projection display apparatus, comprising:
   an outer case;
   receiving means for receiving a recording medium, said receiving means including an insertion opening;
   recording medium drive means for retrieving information stored in a recording medium received in said receiving means and for supplying image signals corresponding to said information retrieved from said recording medium;
   a power supply unit;
   a light source lamp unit;
   a shield case for enclosing at least one of said power supply unit and said light source lamp unit;
   image projection means for forming an optical image corresponding to said image signals supplied from said recording medium drive means and for projection enlarging said optical image for display on a screen;
   wherein said receiving means, said recording medium drive means, and at least a portion of said image projection means are housed in said outer case; and
   said receiving means is securely fastened to said shield case.

2. The projection display apparatus of claim 1, further comprising
   a group of input/output terminals arranged on a first side of said outer case; and
   wherein the insertion opening is positioned toward a bottom of said outer case.

3. The projection display apparatus of claim 1, further comprising a group of input/output terminals for communicating with an external device, the group of input/output terminals and said insertion opening being arranged on a first side of said outer case.

4. The projection display apparatus of claim 1, further comprising
   a group of operating switches arranged adjacent to said insertion opening; and
   wherein said insertion opening is positioned toward a top of said outer case.

5. The projection display apparatus of claim 3, further comprising
   a group of operating switches arranged adjacent to said insertion opening; and
   wherein said insertion opening is positioned toward a top of said outer case.

6. The projection display apparatus of claim 4 wherein said recording medium drive means is fixed in a position above said light source lamp unit.

7. The projection display apparatus of claim 5 wherein said recording medium drive means is fixed in a position above said light source lamp unit.

8. The projection display apparatus of claim 6, further comprising drive control means for controlling said recording medium drive means and a drive circuit board on which said drive control means is disposed; and
   wherein said drive circuit board is positioned adjacent to said recording medium drive means in a widthwise direction of said outer case.

9. The projection display apparatus of claim 7, further comprising drive control means for controlling said recording medium drive means and a drive circuit board on which said drive control means is disposed; and wherein said drive circuit board is positioned adjacent to said recording medium drive means in a widthwise direction of said outer case.

10. The projection display apparatus of claim 1 wherein said recording medium received by said receiving means is a floppy disk, and said recording medium drive means includes a floppy disk drive.

11. The projection display apparatus of claim 1 wherein said recording medium received by said receiving means is a PCMCIA card, said insertion opening is a PCMCIA slot, and said recording medium drive means includes a PCMCIA drive.

12. A projection display apparatus, comprising:

an outer case;

receiving means for receiving a recording medium, said receiving means including an insertion opening;

recording medium drive means for retrieving information stored in a recording medium received in said receiving means and for supplying image signals corresponding to said information retrieved from said recording medium;

a power supply unit;

a light source unit;

optical means for optically processing light emitted from said light source unit to form an optical image corresponding to said image signals supplied from said recording medium drive means;

a shield case for enclosing at least one of said power supply unit and said light source; and projection means for projection enlarging said optical image for display on a screen;

wherein said receiving means, said recording medium drive means, said shield case, said light source, said power supply unit, said optical means, and at least a portion of said projection means are housed in said outer case; and said receiving means is securely fastened to said shield case.

13. The projection display apparatus of claim 12, further comprising a group of input/output terminals arranged on a first side of said outer case; and wherein said insertion opening is positioned toward a bottom of said outer case.

14. The projection display apparatus of claim 12, further comprising a group of input/output terminals for communicating with an external device, said group of input/output terminals and said insertion opening being arranged on a first side of said outer case.

15. The projection display apparatus of claim 12, further comprising a group of operating switches arranged adjacent to said insertion opening; and wherein said insertion opening is positioned toward a top of said outer case.

16. The projection display apparatus of claim 14, further comprising a group of operating switches arranged adjacent to said insertion opening; and wherein said insertion opening is positioned toward a top of said outer case.

17. The projection display apparatus of claim 15 wherein said recording medium drive means is fixed in a position above said light source.

18. The projection display apparatus of claim 16 wherein said recording medium drive means is fixed in a position above said light source.

19. The projection display apparatus of claim 17, further comprising drive control means for controlling said recording medium drive means and a drive circuit board on which said drive control means is disposed; and wherein said drive circuit board is positioned adjacent to said recording medium drive means in a widthwise direction of said outer case.

20. The projection display apparatus of claim 18, further comprising drive control means for controlling said recording medium drive means and a drive circuit board which said drive control means is disposed; and wherein said drive circuit board is positioned adjacent to said recording medium drive means in a widthwise direction of said outer case.

21. The projection display apparatus of claim 12 wherein said recording medium received by said receiving means is a floppy disk, and said recording medium drive means includes a floppy disk drive.

22. The projection display apparatus of claim 12 wherein said recording medium received by said receiving means is a PCMCIA card, said insertion opening is a PCMCIA slot, and said recording medium drive means includes a PCMCIA drive.

* * * * *

UNITED STATES PATENT AND TRADEMARK OFFICE
CERTIFICATE OF CORRECTION

PATENT NO. : 5,676,442
DATED : October 14, 1997
INVENTOR(S) : Motoyuki Fujimori

It is certified that error appears in the above-identified patent and that said Letters Patent is hereby corrected as shown below:

Column 16, line 33, insert --on-- after "board".

Signed and Sealed this

Twentieth Day of January, 1998

Attest:

BRUCE LEHMAN

Attesting Officer

Commissioner of Patents and Trademarks